United States Patent [19]

Dietz et al.

[11] Patent Number: 5,155,147
[45] Date of Patent: Oct. 13, 1992

[54] METHOD OF MAKING A PRESSIBLE MIXTURE OF LIGNOCELLULOSE-CONTAINING FIBERS AND A THERMOPLASTIC MATERIAL HAVING STRONGER BONDING BETWEEN THE FIBERS AND THE THERMOPLASTIC MATERIAL

[75] Inventors: Martin Dietz, Mainhardt; Bernd Asseier, Freiberg, both of Fed. Rep. of Germany

[73] Assignee: Werzalit Aktiengesellschaft & Co., Oberstenfeld near Stuttgart, Fed. Rep. of Germany

[21] Appl. No.: 446,982

[22] Filed: Dec. 6, 1989

[30] Foreign Application Priority Data

Dec. 8, 1988 [DE] Fed. Rep. of Germany ....... 3841310

[51] Int. Cl.⁵ .............................................. C08L 97/00
[52] U.S. Cl. .......................................... 524/9; 524/13
[58] Field of Search ...................................... 524/13, 9

[56] References Cited

U.S. PATENT DOCUMENTS 2,601,598  6/1952  Daniel et al. .................... 524/9
3,410,813  11/1966 Campbell et al. ................ 524/9
3,943,079  3/1976  Hamed ...................... 260/17.4 BB
4,414,267  11/1983 Coran et al. .................... 524/14

FOREIGN PATENT DOCUMENTS 2752159  6/1979  Fed. Rep. of Germany.
3230888  3/1983  Fed. Rep. of Germany.

*Primary Examiner*—Nathan M. Nutter
*Assistant Examiner*—Jeffrey Culpeper Mullis
*Attorney, Agent, or Firm*—Michael J. Striker

[57] ABSTRACT

The method of making a pressible mixture of lignocellulose-containing fibers and a thermoplastic material includes mixing the fibers with 2 to 8% by weight of a duroplastic, preferably an aminoplast or a phenoplast, 0.5 to 2% by weight of a hydrophobic agent for example, paraffin, and 2 to 10% by weight of an aqueous dispersion of methacrylate and/or polyethylene to form a pretreated fiber mixture and then subsequently mixing 100 parts by weight of the pretreated fiber mixture with from 120 to 150 parts by weight of a thermoplastic powder.

9 Claims, No Drawings

METHOD OF MAKING A PRESSIBLE MIXTURE OF LIGNOCELLULOSE-CONTAINING FIBERS AND A THERMOPLASTIC MATERIAL HAVING STRONGER BONDING BETWEEN THE FIBERS AND THE THERMOPLASTIC MATERIAL

BACKGROUND OF THE INVENTION

Our invention relates to a method of making a pressible mixture of lignocellulose-containing fibers and a thermoplastic material.

One such method is already known and described in German Patent Document DE-A-32 30 888.

For some time and to an increasing extent molded parts, for example semifinished panels made from thermoplastic material and glass fiber, have been manufactured for use in automobile production.

Specifically a glass fiber-thermoplastic molded part, also GMT(Glass Mat Reinforced thermoplastic), has been made in the following way: First, a semifinished panel made from glass fibers and a thermoplastic material is produced in a laminating press. This semifinished panel is heated in a second process step outside of the press until at the softening temperature of the thermoplastic and subsequently is pressed in a cooled press under high pressure to form a molded part. In this method usually the blank for the semifinished panel is smaller than the size of the already finished pressed molded part, i.e. the material of the semifinished panel flows simultaneously in the pressing operation. Thus the socalled flowing pressing occurs.

Molded parts for the already mentioned and additional applications may be made with the same quality economically, if in making the semifinished panels lignocellulose-containing fiber are used instead of glass fibers. The lignocellulose-containing fibers may be comminuted, cut up and dried wood chips, bagasse fibers and the like. It is however difficult to make semifinished panels from the lignocellulose-containing fibers and a thermoplastic material, since the lignocellulose-containing fibers contain a natural resin portion, which prevents the fibers from attaining a tight, strong bond with the thermoplastic material.

In the previously mentioned process to overcome this difficulty, the lignocellulose-containing fibers are exposed to ionizing radiation, e.g. gamma radiation, prior to mixing with the thermoplastic. It is questionable whether such a treatment is feasible on a large scale and, even if it were, such a method of manufacture of thermoplastic-wood fiber semifinished panels would be costly.

SUMMARY OF THE INVENTION

It is an object of our present invention to provide a method of treating lignocellulose-containing fibers, so that they form a strong bond with a thermoplastic material in a lignocellulose-containing fiber-thermoplastic mixture when the mixture is pressed.

It is also an object of our invention to provide a method of making a pressible mixture of a lignocellulose-containing fiber and a thermoplastic material, with which a semifinished panel, in which there is a strong bond between the fiber and the thermoplastic material, can be produced.

Accordingly, these objects and others which will be made more apparent hereinafter, are attained in a method of making a pressible mixture of lignocellulose-containing fibers and a thermoplastic material comprising mixing lignocellulose-containing fibers having less than 2% by weight water with 2 to 8 % by weight of a duroplastic, 0.5 to 2% by weight of a hydrophobic agent and 2 to 10% by weight of a methacrylate and/or polyethylene dispersion in a mixer to form a pretreated fiber mixture and then subsequently mixing 100 parts by weight of the pretreated fiber mixture with from 120 to 150 parts by weight of a thermoplastic powder.

From the fibers pretreated in this way fiber material mats can be made in a known way, e.g. with a spraying machine or a mat molding head. This fiber material mat similarly can be pressed in a known way to heat and, if necessary, cool the press to a semifinished panel. The molded part is made from the semifinished panel by preheating the semifinished panel and subsequently flowing pressing in the cooled apparatus, with which the glass fiber-thermoplastic semifinished panel is prepared.

The molded parts according to the invention have only poor properties in applications in which glass fiber-thermoplastic molded parts according to the state of the known art are used. However for many applications the molded part made from the mixture of lignocellulose containing fibers and heatable duroplastic is sufficient and substantially better than the known wood fiber molded part.

In testing the process according to our invention the pretreatment of the lignocellulose-containing fibers had the following advantageous features: The lignocellulose-containing fibers should have a moisture content under 2% dry. Combinations of amino- and phenoplasts can be used as duroplasts. These aqueous resin dispersions improve the addition and adherence of the thermoplastic powder to the lignocellulose-containing fibers. As hydrophobic agent, i.e. moisture-containing protective agent, a commercial, e.g. 60% paraffin emulsion, is suitable. The methacrylate and/or polyethylene dispersion improves the bonding of the lignocellulose-containing fibers and thermoplastic in cooperation with the resin material.

Satisfactory results are then obtained with the process according to our invention, when the fibers are mixed with 3 weight percent of duroplastic and 3 weight percent aqueous methacrylate and/or polyethylene dispersion, and additionally 2 to 10 percent by weight aqueous methacrylate dispersion and/or a polyethylene dispersion.

The thermoplastic powder is selected according to the properties which reside in the finished molded body. For many molded parts a suitable plastic such as polypropylene can be used. For other parts polyethylene or another thermoplastic may be used.

While the invention has been illustrated and described as embodied in an improved method for making a pressible mixture of lignocellulose fibers and a thermoplastic material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims.

We claim:

1. A method of making a pressible mixture of lignocellulose-containing fibers and a thermoplastic material comprising the steps of mixing lignocellulose-containing fibers having less than 2% by weight water with 2 to 8% by weight of a duroplastic, 0.5 to 2% by weight of a hydrophobic agent and 2 to 10% by weight of an aqueous dispersion of a member selected from the group consisting of methacrylates, polyethylene and mixtures thereof to form a pretreated fiber mixture and then subsequently mixing 100 parts of said pretreated fiber mixture with from 120 to 150 parts by weight of a thermoplastic powder to form the pressible mixture.

2. A method according to claim 1, in which said pretreated fiber mixture contains 3% by weight said duroplastic and 3% by weight of said aqueous dispersion.

3. A method according to claim 1, further comprising admixing an additional 2 to 10 percent by weight of another aqueous methacrylate dispersion in forming said pretreated fiber mixture.

4. A method according to claim 1, further comprising admixing an additional 2 to 10 percent by weight of another aqueous polyethylene dispersion in forming said pretreated fiber mixture.

5. A method according to claim 1, wherein said duroplastic is selected from the group consisting of aminoplasts and phenoplasts.

6. A method according to claim 1, wherein said hydrophobic agent comprises a paraffin.

7. A method according to claim 1, wherein said thermoplastic powder comprises polyethylene powder.

8. A method of making a pressible mixture of lignocellulose-containing fibers and a thermoplastic material consisting of the steps of:
   a. forming a pretreated fiber mixture of lignocellulose-containing fibers having less than 2% by weight water with 2 to 8% by weight of a duroplastic selected from the group consisting of aminoplasts and phenoplasts, 0.5 to 2% by weight paraffin and 2 to 10% by weight of an aqueous dispersion of a member selected from the group consisting of methacrylates, polyethylene and mixtures thereof; and
   b. then subsequently mixing 100 parts of said pretreated fiber mixture with from 120 to 150 parts by weight of a thermoplastic powder to form the pressible mixture.

9. A method according to claim 8, wherein said thermoplastic powder comprises polyethylene powder.

* * * * *